Sept. 26, 1967  T. W. MORRISON  3,343,895
ROLLING BEARING ASSEMBLIES
Filed June 4, 1965
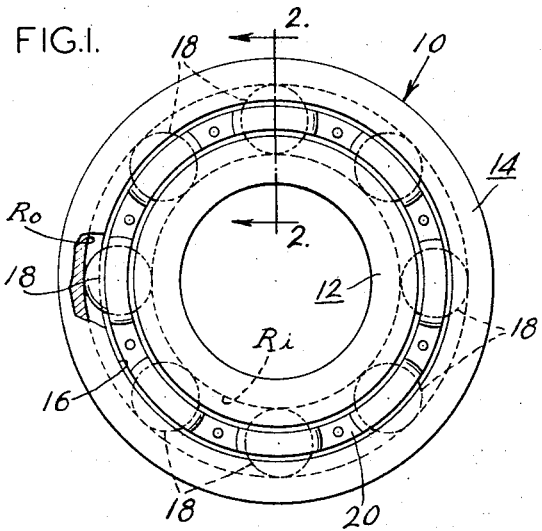
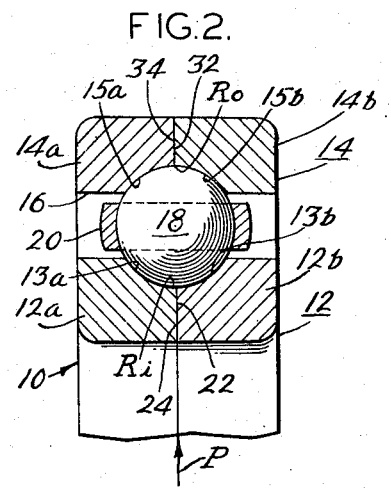
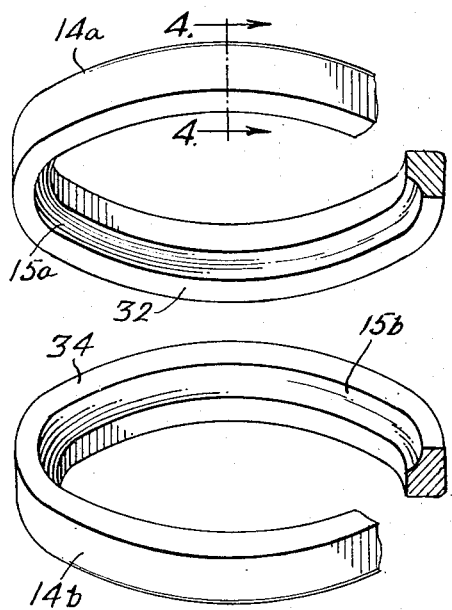
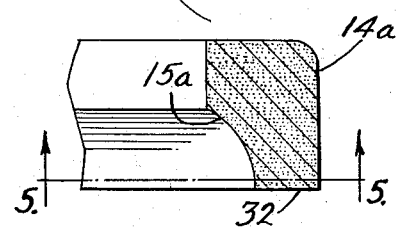
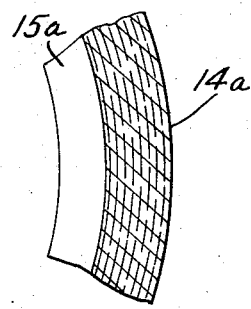
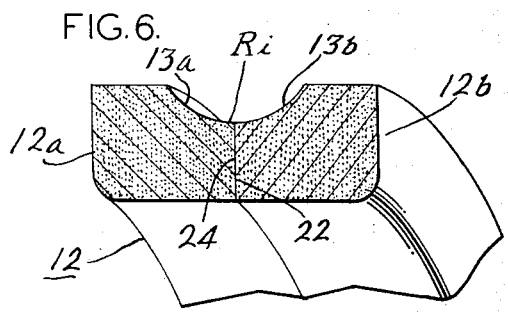
INVENTOR:
THOMAS W. MORRISON
BY Howson & Howson
ATTYS.

United States Patent Office 3,343,895
Patented Sept. 26, 1967

3,343,895
ROLLING BEARING ASSEMBLIES
Thomas W. Morrison, Rydal, Pa., assignor to SKF Industries, Inc., King of Prussia, Pa., a corporation of Delaware
Filed June 4, 1965, Ser. No. 461,462
3 Claims. (Cl. 308—196)

ABSTRACT OF THE DISCLOSURE

A ball bearing assembly having inner and outer rings spaced apart defining an annular space therebetween and a plurality of balls in the annular space engaging arcuate raceways formed in the confronting surfaces of the rings. At least one of the rings consists of a pair of annular ring segments, each ring segment of which is a portion of the finished ring taken through a plane transverse to the rotational axis of the ring including a portion of the arcuate raceway. The ring segments are friction welded to their confronting axial end faces so that the raceway portions of each segment form a continuous raceway whereby the juncture of the segments is engaged by the balls. The fiber direction of the ring segments at least in the area of the raceway is oriented in the direction of rolling movement of the balls to provide for increased resistance to fatigue.

---

This invention relates to bearing assemblies and more particularly to a new and improved method of making the rings of bearing assemblies and to a rolling bearing assembly made by the present method.

In accordance with a conventional method for making rings for rolling bearing assemblies, annular blanks are cut from tubular steel or bar stock and thereafter the blanks are machined to approximately the finished dimensions of the ring. In the case of rings for ball bearings, the machining also includes formation of the annular groove defining the raceway for the balls in one peripheral surface of the ring. Other machining operations might include formation of grooves in the ring to receive a seal or the like. After machining, the rings are heat treated and ground to final size.

In accordance with the present invention, it is proposed to make the rings for rolling bearing assemblies by forming, for example by pressing, forging or other operation, in the present instance, a pair of segments or sections comprising the finished ring. In the illustrated embodiment of the invention, the segments comprise one-half of the finished ring divided by a plane transverse to the rotational axis of the ring and through the geometric center thereof. Thus each of the ring segments comprises an annular member formed with a curved or spherical surface of revolution defining a portion of the raceway. Thereafter, the ring segments are joined at confronting axial end faces by a friction weld. This is accomplished by bringing the axial end faces into pressure-applying relation and rotating the segments relative to one another whereby the ring segments fuse due to local melting of the metal at the confronting axial end faces to form a unitary ring. Thereafter, the raceway of the ring is finished by a conventional finish grinding procedure.

The present method for making rings for rolling bearing assemblies is much more economical than the prior method discussed above. For example, in accordance with the present invention there is substantially no material waste as contrasted with the prior method which employs comparatively expensive tube material and wherein there is a comparatively large scrap loss by reason of the machining operations. Moreover, machining is much more costly and time consuming than pressing, or forging and welding in accordance with the present invention.

Additionally, a bearing assembly made in accordance with the present invention has a substantially greater fatigue life. For example, in rings made from tubular stock, the useful life is limited by surface fatigue and one factor adversely affecting fatigue life is that the grain or fiber direction of the finished grain, especially in the area of the raceways, is not uniform. In other words, in some areas of the raceway, end grain is presented at the ball path and at others side grain and in still others it is somewhere in between. In areas where side grain is presented at the ball path, the grain flow or fiber direction is in the direction of the axis of the tube, i.e., at 90° to the direction of the rolling of the balls. In accordance with the present invention the ring halves may be forged so that the grain flow or fiber direction is in the direction of rolling of the balls or rollers and it has been found that when this is the case, the fatigue life of the bearing assembly is greatly improved.

There are other factors contributing to fatigue. For example, it has been found that the material at the outer periphery of the stock from which rings are made gives significantly longer contact fatigue life than the material toward the center of the ingot for the reason that slag inclusions or impurities tend to collect toward the center of the stock when it is cast. Thus, when making bearing rings from tubes or bar stock by the conventional method, the raceway is formed by machining away the best material for rolling contact fatigue and the raceway surface material is closer to the center of the stock. Therefore, the fatigue life of these bearings is further limited. This contrasts with the present method wherein the relationship between the surface and center ingot material is maintained during the forging or pressing process so that the balls or rollers engage surface material. Hence, bearings made in accordance with the present invention have greater fatigue life.

With the foregoing in mind, an object of the present invention is to provide a new and improved method for making rings for bearing assemblies which is highly economical.

A further object of the present invention is to provide a new and improved method for making rings for rolling bearing assemblies whereby the assemblies are characterized by a greater fatigue life.

A still further object of the present invention is to provide rolling contact bearing assemblies having improved resistance to fatigue.

These and other objects of the present invention and the various features and details thereof are hereinafter more fully set forth with reference to the accompanying drawing, wherein:

FIG. 1 is a side elevational view of a bearing assembly in accordance with the present invention;

FIG. 2 is an enlarged sectional view taken on lines 2—2 of FIG. 1;

FIG. 3 is a fragmentary perspective view of the segments comprising a ring for a rolling bearing assembly in accordance with the present invention;

FIG. 4 is an enlarged sectional view taken on line 4—4 of FIG. 3 showing the grain or fiber structure of the ring segment;

FIG. 5 is an enlarged fragmentary sectional view taken on line 5—5 of FIG. 4; and FIG. 6 is a fragmentary perspective view of a portion of a ring for rolling bearing in accordance with the present invention.

Referring now to the drawing and particularly to FIG. 1 thereof, there is shown a bearing assembly 10 in accordance with the present invention. The bearing assembly 10 comprises inner and outer rings 12 and 14 respectively, which are spaced apart to define an annular space 16 therebetween and a plurality of rolling elements, in the present instance balls 18, in the annular space between the rings. The inner and outer rings 12 and 14 are provided with raceways $R_i$ and $R_o$ respectively on which the balls ride. The bearing assembly further includes a conventional cage 20 to circumferentially space the balls 18 in the annular space. Even though the present invention is illustrated in connection with a single row, deep groove ball bearing assembly, it is to be understood that the principle of the invention applies also to other types of bearing assemblies.

In accordance with the present invention, at least one of the rings and preferably both rings of the bearing assembly are of a two-piece construction. Thus, as illustrated in FIG. 2, the inner ring 12 comprises two annular segments 12a and 12b which, in the present instance comprise the halves of a finished ring divided by a plane P transverse to the rotational axis of the ring and through the geometrical center of the ring. The ring segments 12a and 12b have circumferentially extending spherical surfaces of revolution 13a and 13b adjacent their outer peripheral surface defining in the assembled relation the inner raceway $R_i$. The segments 12a and 12b of the inner ring are joined together along their confronting inner axial end faces 22 and 24 respectively by means of a friction weld connection. In the present instance, the outer ring 14 also comprises a pair of annular ring segments 14a and 14b. The ring segments 14a and 14b have circumferentially extending spherical surfaces of revolution 15a and 15b adjacent their inner peripheral surface defining in the assembled relation the outer raceway $R_o$. The annular segments 14a and 14b of the outer ring are joined along their confronting inner axial end faces 32 and 34 by means of a friction weld connection.

In accordance with the new and improved method of the present invention for making a ring for a rolling bearing assembly, as it applies to the outer ring of the bearing assembly described above, each of the ring segments 14a and 14b is formed by forging, pressing or other forming operation to the configuration shown for example in FIG. 3 of the drawing. As a result of this operation, as best illustrated in FIGS. 4 and 5, the grain structure of each of the ring segments is aligned with the direction of rolling of the balls in the raceway. The ring segments 14a and 14b are then brought into pressure-applying contact at their confronting inner axial end faces 32 and 34 respectively and then by applying pressure and rotating the ring segments relative to one another, local melting of the metal takes place with the result that the ring segments 14a and 14b fuse to one another by means of a so-called friction weld to form the outer ring 14. Thereafter, the raceway $R_o$ may be finished by conventional grinding process. The inner ring 12 may be made by an identical process. It is noted that in most cases it would not be feasible to forge the entire ring for a ball bearing assembly.

As contrasted with prior methods wherein rings were machined from tubular or bar stock and where the grain or fiber direction was random, the bearing of the present invention gives a much longer fatigue life because of the more favorable uniform grain or fiber orientation of the raceways in relation to the rolling direction of the balls or rollers. Furthermore, by the present method the surface of the forged segments comprising the rings defines the raceways for the rolling elements. In other words, the balls or rollers are operating on ingot surface material exclusively. This contrasts with rings machined from bar stock or tubing wherein the balls or rollers operate on material some distance from the ingot surface material due to the fact that the surface material is removed during the machining operation. In the present instance, the center of the forged ring segment where the slag and impurities tend to accumulate is remote from the raceway surface. Accordingly, since the surface metal of an ingot gives significantly longer rolling contact fatigue life as compared with the material toward the center where the slag inclusions and impurities tend to collect during formation of the ingot, the result is significantly increased fatigue life.

The present method of making rings for rolling bearing assemblies is more economical than the prior method discussed above wherein the rings were machined from tubular stock or bar stock for the reason that, as is readily apparent, there is less waste material. Moreover, storage of stock material is also greatly reduced.

While a particular method of making a ring for rolling bearing assemblies has been illustrated and described herein, and while a particular type of rolling bearing assembly incorporating a ring made in accordance with the present invention is shown, it is not intended to limit the invention and changes and modifications may be made therein within the scope of the following claims.

I claim:

1. A ball bearing assembly comprising inner and outer rings spaced apart to define an annular space therebetween, confronting surfaces of said rings having arcuate raceways, a plurality of balls in the annular space between said rings engaging the raceways, at least one of said rings comprising a pair of annular ring segments, each ring segment comprising a portion of the finished ring taken through a plane transverse to the rotational axis of the ring including a portion of the arcuate raceway in said one ring, said ring segments being friction welded at their confronting axial end faces so that the raceway portions of each segment form the raceway of the said one ring whereby the juncture of said ring segments forms a part of the arcuate raceway in said one ring engageable by said balls.

2. A ball bearing assembly as claimed in claim 1 wherein each ring segment comprises a portion of the finished ring taken through a plane transverse to the rotational axis of the ring and through the geometric center thereof.

3. A rolling bearing assembly as claimed in claim 1 wherein the fiber direction of the ring segments at least in the area of the raceway is oriented in the direction of rolling movement of the rolling elements.

References Cited

UNITED STATES PATENTS

| Re. 15,233 | 11/1921 | Sellew | 308—196 |
| 1,374,988 | 4/1921 | Cooper | 308—196 |
| 1,782,262 | 11/1930 | Kilian | 308—196 |
| 1,967,821 | 2/1932 | Hess | 29—148.4 |
| 3,134,169 | 5/1964 | Hollander | 29—470.3 |

FOREIGN PATENTS 669,003    3/1952    Great Britain.

MARTIN P. SCHWADRON, *Primary Examiner.*

FRANK SUSKO, *Examiner.*